United States Patent [19]

Kimura et al.

[11] Patent Number: 5,574,710
[45] Date of Patent: Nov. 12, 1996

[54] DISC REPRODUCING APPARATUS

[75] Inventors: Izumi Kimura; Toshifumi Takeuchi, both of Yokohama, Japan

[73] Assignee: Hitachi, Ltd., Tokyo, Japan

[21] Appl. No.: 511,806

[22] Filed: Aug. 7, 1995

[30] Foreign Application Priority Data

Aug. 8, 1994 [JP] Japan .................................. 6-186021

[51] Int. Cl.⁶ ............................................... G11B 7/00
[52] U.S. Cl. ................................ 369/60; 369/50; 369/32
[58] Field of Search ................................. 369/54, 59, 60, 369/48, 47, 32, 50, 44.26

[56] References Cited

U.S. PATENT DOCUMENTS 5,086,421  2/1992  Tateishi ..................................... 369/54
5,315,571  5/1994  Maeda et al. ............................. 369/47

FOREIGN PATENT DOCUMENTS 59-185071  10/1984  Japan .
5-250804    9/1993  Japan .
6-89506     3/1994  Japan .

Primary Examiner—Nabil Z. Hindi
Attorney, Agent, or Firm—Antonelli, Terry, Stout & Kraus

[57] ABSTRACT

In a reproducing apparatus for an optical disc recorded at a constant linear velocity (CLV), so as to increase the reproducing access speed, a first clock generator for generating a reproducing clock corresponding to the transmission rate of a digital information signal, an oscillator for oscillating at a fixed frequency, a second clock generator for generating a master clock which is a reference of operations of a first controller for controlling the linear velocity, a digital signal processor, and a second controller for controlling the storage from the clock generated by the oscillator, a third clock generator for generating a master clock which is a reference of operations of the digital signal processor and the second controller without using the oscillator, and a switch for switching the master clock which is a reference of operations of the digital signal processor and the second controller to one of the clock by the second clock generator and the clock by the third clock generator are provided.

6 Claims, 7 Drawing Sheets 5,574,710

DISC REPRODUCING APPARATUS

BACKGROUND OF THE INVENTION

The present invention relates to a reproducing apparatus of a disc on which digital signals are recorded and more particularly to a disc reproducing apparatus suited to improve the reproducing access speed of an optical memory disc on which digital signals are recorded at a constant linear velocity.

One of optical memory discs on which digital signals are recorded is a compact disc (hereinafter abbreviated to a CD). On a CD, audio signals which are converted to digital data are recorded at a constant linear velocity (hereinafter abbreviated to a CLV) so as to increase the recording density. A CD player for reproducing a CD rotates the disc under the CLV control as disclosed in Japanese Patent Application Laid-Open Sho 59-185071 (a first conventional example). To detect digital data recorded by a non-contact optical pickup, the access speed as an audio output device is fast. Furthermore, a subcode as address information is also recorded on the disc, so that the head of the desired music can be searched easily.

As an optical memory disc on which digital signals are recorded, there is a CD-ROM using a CD as a data memory available beside the above. When the CD-ROM is reproduced, it is required from a part as a data memory that the access speed is fast. Rotational speed control for a disc may be cited as one of the factors for deciding this access speed and the ratio of rotational speed between the inner diameter zone of a disc and the outer diameter zone is about 2.3 under the CLV control, so that the time required for the number of revolutions to reach a constant linear velocity comes into a problem.

For this problem, as disclosed in Japanese Patent Application Laid-Open Hei 5-250804 (a second conventional example) proposed by the applicant of this patent, an art for controlling a disc recorded at a CLV at a constant angular velocity (hereinafter abbreviated to a CAV) for reproduction and improving the access speed for disc reproduction has been proposed.

As disclosed in Japanese Patent Application Laid-Open Hei 6-89506 (a third conventional example) proposed by the applicant of this patent, an art for controlling a disc recorded at a CLV for normal reproduction, controlling the rotational speed so as to keep it unchanged by changing the linear velocity for access from the inner diameter zone of the disc to the outer diameter zone or from the outer diameter zone to the inner diameter zone, and furthermore changing the frequencies of the digital data sampling clock and the clock for data processor and RAM controller of the reproducing digital signal processing including the CLV controller in correspondence with the transmission rate of the digital data picked up from the disc has been proposed.

When a CD-ROM is reproduced under the CLV control described in the aforementioned first conventional example, the ratio of rotational speed between the inner diameter zone of a disc and the outer diameter zone is about 2.3 as described above, so that it takes a lot of time until the number of revolutions reaches a constant linear velocity for access from the inner diameter zone of the disc to the outer diameter zone or from the outer diameter zone to the inner diameter zone and there is a problem imposed in the access speed for the data memory. This access speed depends on the performance of a motor for rotating a disc. However, improvement of the performance of the motor is naturally limited.

In the aforementioned second conventional example, since a motor is controlled at a CAV, a problem arises that it is necessary to provide a means for detecting rotational speed and the constitution of the motor is complicated.

According to the art disclosed in the aforementioned third conventional example, the CAV control is necessary during the period of access. Therefore, a problem arises that the CLV controller is complicated, and a circuit for changing the clock frequency for data processor and RAM controller is required, and furthermore the burden of the system control microcomputer is increased. Furthermore, it is not taken into account to control the write speed and the read speed from the memory (RAM) for deinterleaving at the time of error correction and prevent the RAM from overflowing or underflowing by following the linear velocity of a disc changing at the time of access.

Therefore, an object of the present invention is to provide a disc reproducing apparatus which can reproduce an optical disc recorded at a CLV such as a CD or a CD-ROM at a fast access speed.

Another object of the present invention is to provide a disc reproducing apparatus with a fast access speed which requires no complicated and expensive additional part such as a means for detecting rotational speed and uses an inexpensive motor with ordinary performance.

Still another object of the present invention is to provide a disc reproducing apparatus in which the RAM neither overflows nor underflows at the time of reproduction.

To accomplish the above objects, the basic characteristic of the present invention is that a means of changing the frequencies of the digital data sampling clock in correspondence with the transmission rate of the digital data picked up from a disc and the clock for data processor and RAM controller of the reproducing digital signal processing means including the RAM controller except the CLV controller by following an change in the rotational speed of the disc motor by the CLV controller, that is, a change in the linear velocity at the time of access is provided. By this characteristic of the present invention, a subcode including a time code can be reproduced by a constitution of a brief CLV controller before the linear velocity is settled at the time of access, and the RAM is prevented from overflowing or underflowing, and the pull-in time after end of access is shortened by operating the CLV controller always by a constant high speed clock, and the access speed for reproducing the disc recorded at the CLV can be improved.

The more detailed characteristics of the present invention are as follows: A disc reproducing apparatus for reproducing a disc on which a digital information signal such as an error correction code or a subcode including a time code is recorded in the predetermined recording format at a CLV comprises:

a driver for rotating the disc at the CLV;

a CLV controller for controlling the linear velocity;

a reader for reading the aforementioned digital information signal from the disc;

a digital signal processor for executing the predetermined reproducing digital signal processing such as demodulation and error correction for the digital information signal which is outputted from the reader in correspondence with the aforementioned recording format;

a RAM for rearranging and memorizing data temporarily so as to perform an error correction corresponding to the recording format;

a RAM controller for controlling the RAM;

a first clock generator for generating a reproducing clock corresponding to the transmission rate of the digital information signal;

an oscillator for oscillating at a fixed frequency;

a second clock generator for generating a first master clock which is a reference of operations of the digital signal processor, the CLV controller, and the RAM controller from a clock by the oscillator;

a third clock generator for generating a second master clock which is a reference of operations of the digital signal processor and the RAM controller without using the oscillator;

a switch for switching the master clock which is a reference of operations of the digital signal processor and the RAM controller to one of the first master clock by the second clock generator and the second master clock by the third clock generator;

an access controller for controlling the CLV controller and the switch; and a fourth controller for controlling the whole disc reproducing system;

wherein the access controller controls the switch and switches the clock so that when the disc reproducing system is in the normal reproducing operation state, the digital signal processor and the RAM controller operate by the clock generated by the second clock generator and when the disc reproducing system is in the access operation state, they operate by the clock generated by the third clock generator and the CLV controller operates always by the clock generated by the second clock generator.

According to the aforementioned characteristics, the access controller controls so that the digital signal processor and the RAM controller operate by the first master clock generated by the second clock generator when the disc reproducing system is in the normal reproducing operation state and they operate by the second master clock generated by the third clock generator when the disc reproducing system is in the access operation state and the CLV controller operates always by the second master clock generated by the second clock generator, so that even when no linear velocity for access is settled in the conventional constitution of the CLV controller, a subcode including a time code can be reproduced, and the RAM is prevented from overflowing or underflowing, and furthermore the CLV controller is operated always by a constant high speed clock, and thus the pull-in time after end of access can be minimized and the access speed for reproducing the disc recorded at the CLV can be improved.

According to the present invention, when a reproducing clock generator following an input signal and an operation clock generator for a data processor and a RAM controller are structured so that at the time of access from the inner diameter zone of a disc to the outer diameter zone or from the outer diameter zone to the inner diameter zone, they generate a voltage for increasing or decreasing the oscillating frequency of the clock simultaneously with start of access so as to control the voltage controlled oscillator and then generate an operation clock following rotation of the disc, that is, a change in the linear velocity, a subcode including a time code can be detected before a linear velocity is settled, and the RAM can be controlled so as to prevent it from overflowing or underflowing, and furthermore since the CLV controller operates always by a constant high speed clock using a crystal, the settling time for making the linear velocity constant can be minimized and the access time can be improved.

The foregoing and other objects and features of the present invention will be understood from the following detailed description of embodiments in connection with the accompanying drawings.

DETAILED DESCRIPTION OF THE PREFERRED EMBODIMENTS

Figure 1:
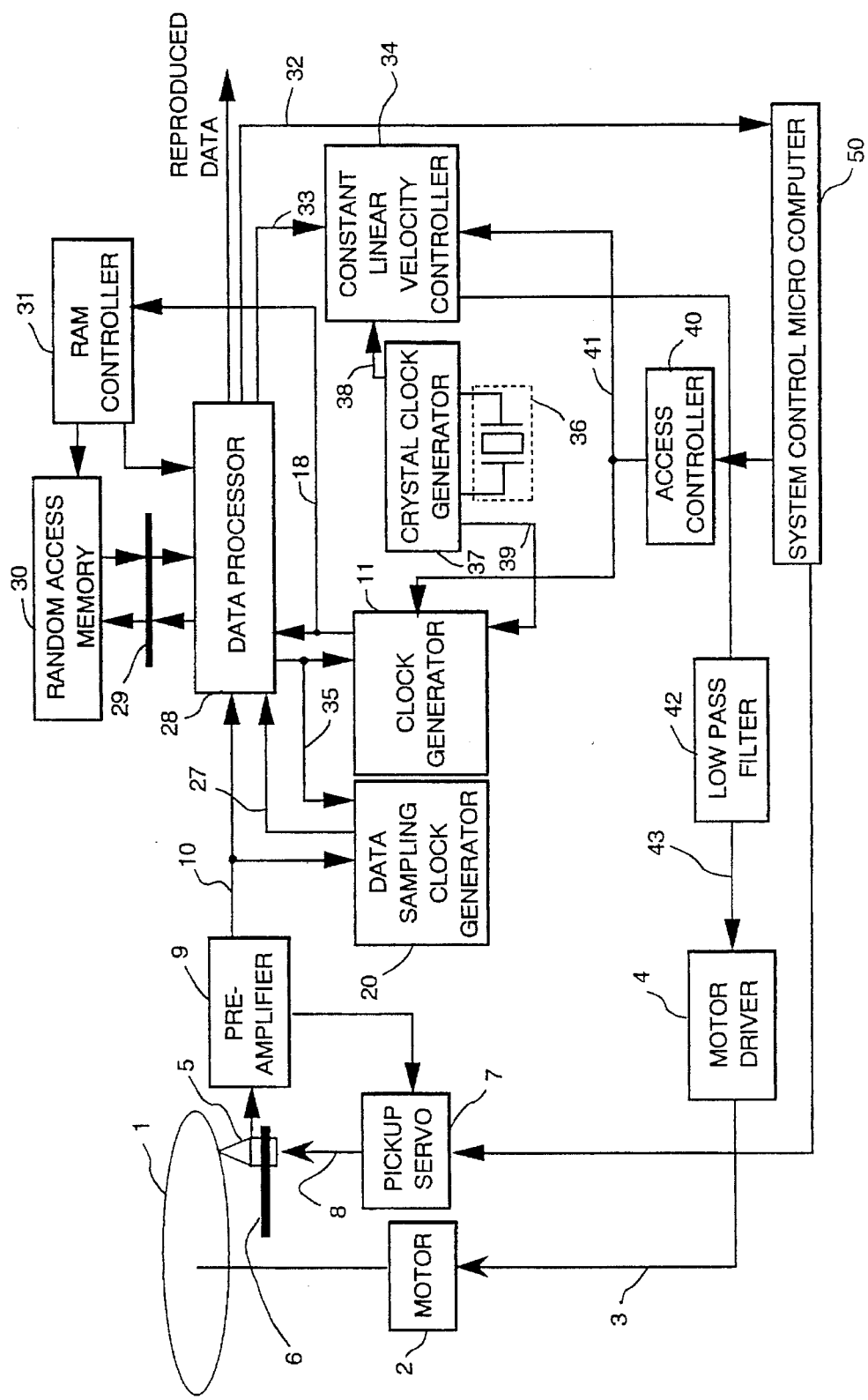
FIG. 1 is a block diagram showing the constitution of a disc reproducing apparatus of a first embodiment of the present invention.
Figure 2:
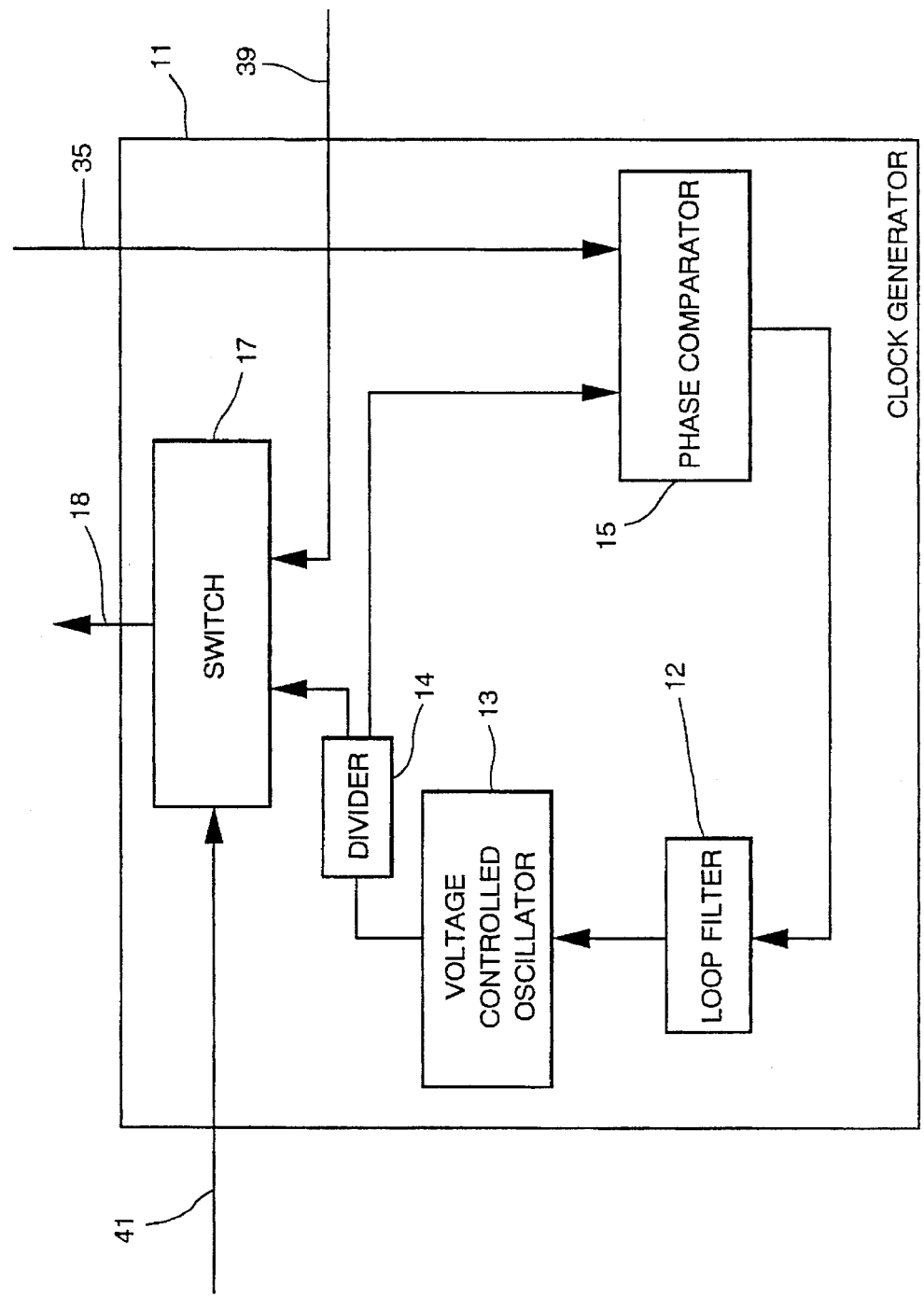
FIG. 2 is a block diagram showing an example of the clock generator shown in FIG. 1.
Figure 3:
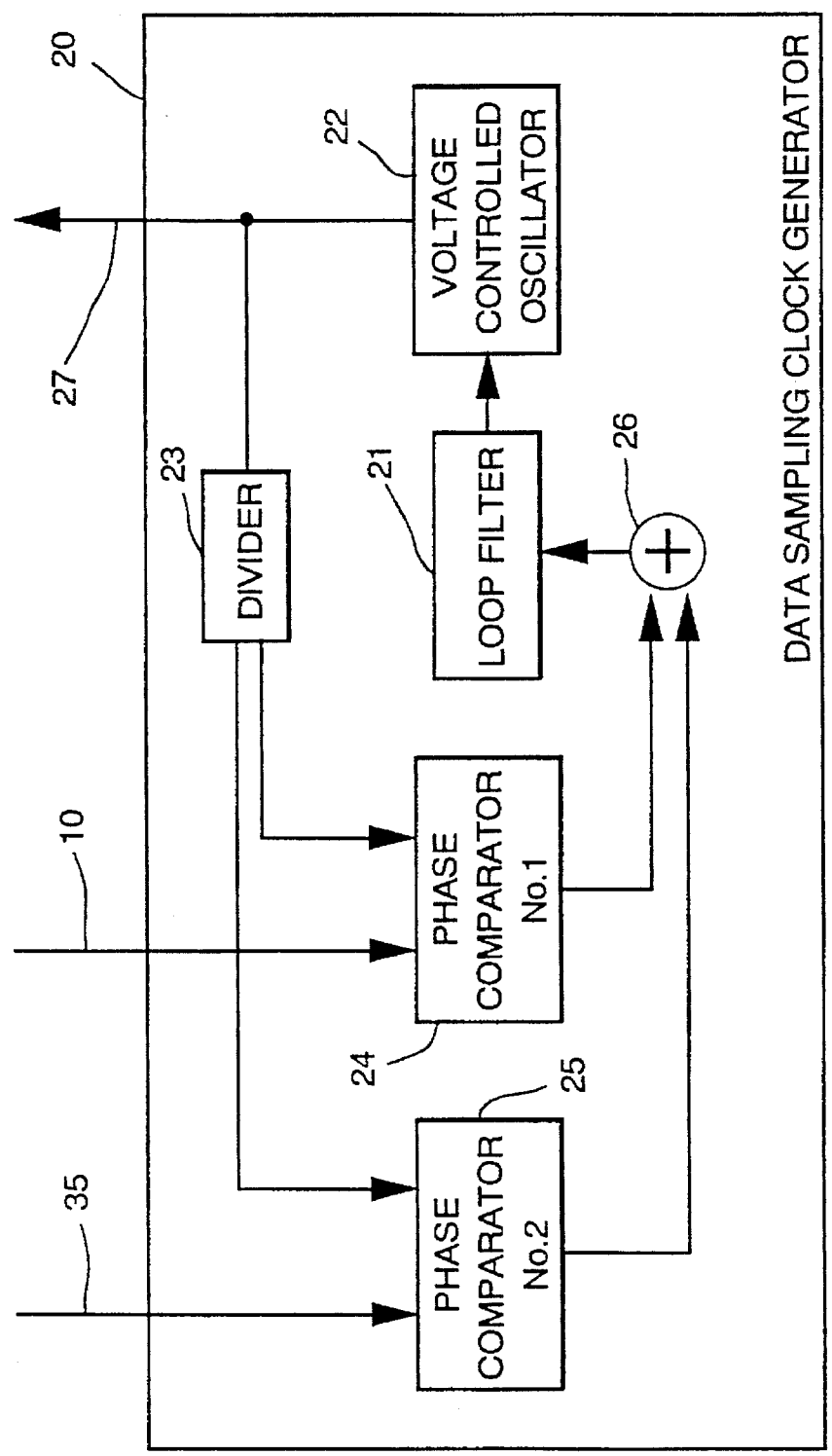
FIG. 3 is a block diagram showing an example of the data sampling clock generator shown in FIG. 1.
Figure 4:
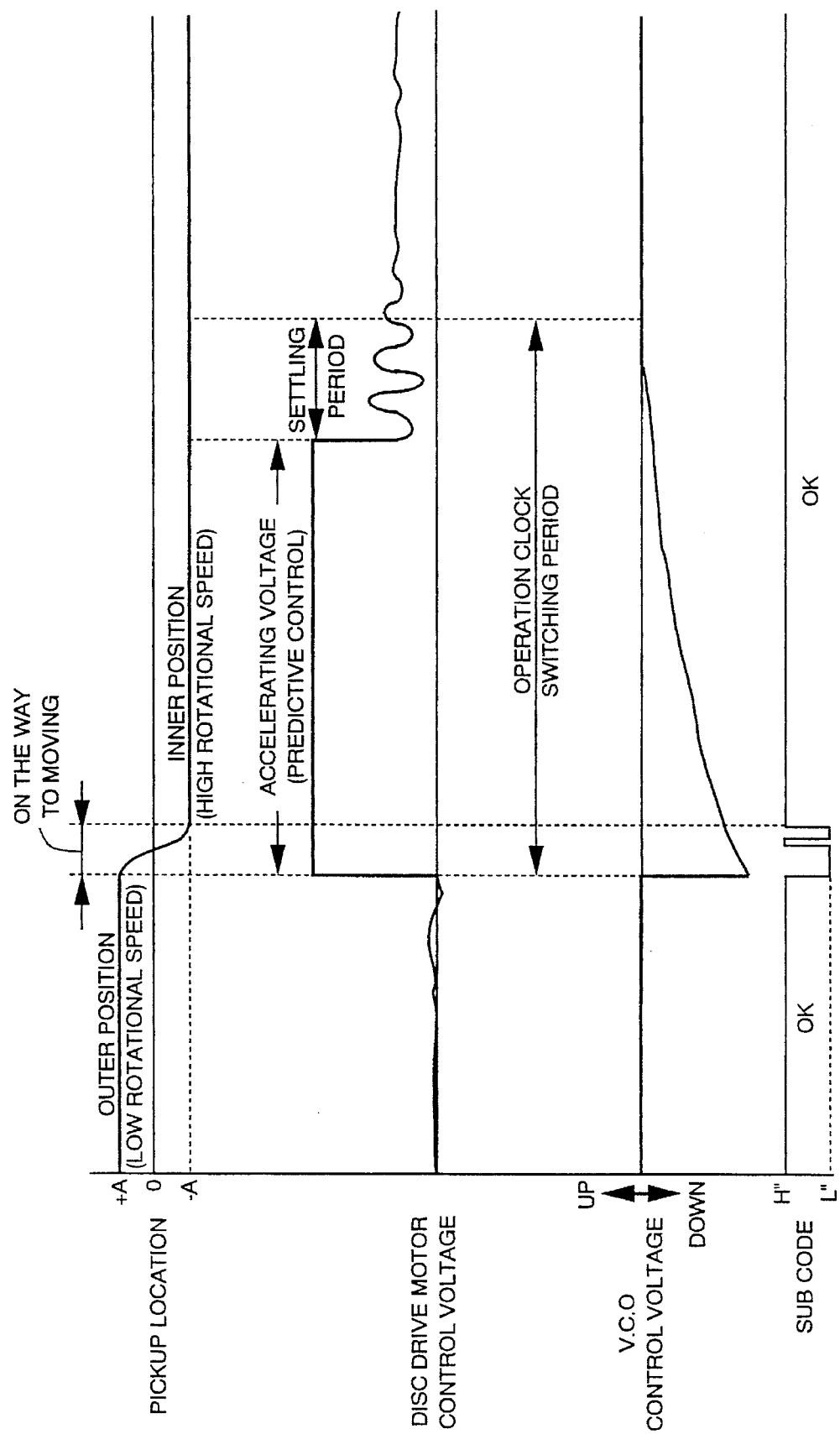
FIG. 4 is a timing chart of a disc drive motor control voltage and a V.C.O. control voltage at the time of access in the first embodiment of the present invention.

FIGS. 1 to 4 relate to the first embodiment of the present invention. FIG. 1 is a block diagram showing the constitution of an optical memory disc reproducing apparatus of the first embodiment of the present invention, and FIG. 2 is a block diagram of the clock generator shown in FIG. 1, and FIG. 3 is a block diagram of the data sampling clock generator shown in FIG. 1, and FIG. 4 is a timing chart of a disc drive motor control voltage and a V.C.O. control voltage at the time of access.

In FIG. 1, a numeral 1 indicates a disc (CD-ROM), 2 a motor for rotating the disc 1, 3 a disc motor driving signal, 4 a motor driver, 5 a pickup (optical pickup), 6 a slider for the pickup 5, 7 a pickup servo circuit, 8 a pickup control signal, 9 a pre-amplifier, 10 an input signal converted to digital data, 11 a clock generator, 18 a clock for data processor and RAM controller by the clock generator 11, 20 a data sampling clock generator for generating a clock following the input signal 10 at a frequency corresponding to the transmission rate of the input signal 10, 27 a sampling clock by the clock for data processor and RAM controller 18, 28 a data processor for executing the predetermined processing such as demodulation or error correction of data, 29 a data bus, 30 a random access memory (RAM) for rearranging and memorizing data for the error correction processing temporarily, 31 a RAM controller for controlling the RAM 30 and the data processor 28, 32 a subcode including a time code obtained by reproducing the input signal 10 and a subcode OK signal indicating completion of the subcode reproduction, 33 pulse width information by crystal clock obtained by reproducing the input signal 10, 34 a constant linear velocity (CLV) controller for controlling the rotation of the disc to a constant linear velocity from the pulse width information by crystal clock 33, 35 pulse width information by crystal clock showing the rotational speed of the disc reproduced from the input signal 10 by the data processor 28, 36 a crystal, 37 a crystal clock generator for generating an operation clock by a clock generated by the crystal 36, 38 a crystal clock (crystal operation clock) of the CLV controller 34, 39 a crystal clock for data processor and RAM controller which is an operation clock for the data processor 28 and the RAM controller 31, 40 an access controller for controlling the CLV controller 34 and the clock generator 11 at the time of access, 41 an access control signal, 42 a low pass filter, 43 a driver control signal, and 50 a system control microcomputer for controlling the whole system.

FIG. 2 is a block diagram showing a constitution example of the clock generator 11 shown in FIG. 1. In the drawing, a numeral 12 indicates a loop filter, 13 a voltage controlled oscillator, 14 a divider, 15 a phase comparator, and 17 a switch.

FIG. 3 is a block diagram showing a constitution example of the data sampling clock generator 20 shown in FIG. 1. In the drawing, a numeral 21 indicates a loop filter, 22 a voltage controlled oscillator, 23 a divider, 24 a phase comparator No.1, 25 a phase comparator No.2, and 26 an adder.

On a CD, voice signals which are converted to digital data are recorded at a constant linear velocity (CLV) so as to increase the recording density. As described previously, the CD-ROM (disc 1) which is used in each embodiment of the present invention uses this CD as a data memory, so that a fast access speed is required from a viewpoint of a roll as a data memory. One of the factors for deciding this access speed is rotational speed control for the disc. Since the ratio of rotational speed between the inner diameter zone of the disc and the outer diameter zone is about 2.3 under the CLV control, it comes into a problem that no data (a subcode including a time code) can be read during the time required for the rotational speed to reach a constant linear velocity and the settling period of the linear velocity. The present invention solves this problem.

Next, the operation at the time of normal reproduction in this embodiment having the aforementioned constitution will be explained first.

In FIG. 1, the disc 1 is rotated by the disc motor 2, and a signal at a transmission rate f is read by the pickup 5 on the basis of the pickup control signal 8 from the pickup servo circuit 7, and the input signal 10 is inputted to the data sampling clock generator 20 and the data processor 28 via the preamplifier 9. The reproducing clock 27 at a frequency F corresponding to the transmission rate f, which follows the input signal 10, is generated by the data sampling clock generator 20 and outputted to the data processor 28. The crystal clock (constant high speed clock) 38 of the CLV controller 34 and the crystal clock for data processor and RAM controller 39 for the data processor 28 and the RAM controller 31 are generated respectively by the crystal clock generator 37 on the basis of the clock from the crystal 36, and the crystal clock 38 is outputted to the CLV controller 34, and the crystal clock for data processor and RAM controller 39 is outputted to the clock generator 11, and it is outputted to the data processor 28 and the RAM controller 31 respectively as a crystal clock 18 by this clock generator 11.

The data processor 28 receiving the input signal 10 rearranges the data under control of the RAM controller 31 and writes it into the RAM 30 temporarily via the data bus 29 so as to demodulate the data and perform the error correction processing. The RAM controller 31 monitors the RAM 30 so as to prevent it from overflowing or underflowing and controls writing and reading of data. The CLV controller 34 performs PWM conversion on the basis of the pulse width information by crystal clock of the disc detected by the data processor 28, generates the driver control signal 43 for keeping the linear velocity constant, and outputs it to the motor driver 4 via the low pass filter 42.

Next, the operation for access from the outer diameter zone of the disc 1 to the inner diameter zone will be explained. The system control microcomputer 50 outputs the access information to the access controller 40 from the subcode 32 including the time code reproduced by the data processor 28 and the access controller 40 outputs the access control signal 41 to the CLV controller 34 and the clock generator 11.

Next, the clock generator 11 will be explained by referring to FIG. 2. The clock generator 11 has, for example, a constitution of a PLL (phase locked loop) circuit as shown in FIG. 2 and consists of the loop filter 12, the voltage controlled oscillator 13, and phase comparator 15. The clock generator 11 follows a change in the rotation of the motor 2, that is, the linear velocity so as to compare the pulse width information by crystal clock 35 from the data processor 28 and a signal generated by dividing the clock generated by the voltage controlled oscillator 13 by the divider 14 with the phase comparator 15. The switch 17 switches the access control signal 41 from the access controller 40 to the clock generated by the PLL circuit during access or to the crystal clock for data processor and RAM controller during normal reproduction and outputs it as a clock for data processor and RAM controller 18.

Next, the data sampling clock generator 20 will be explained by referring to FIG. 3. The data sampling clock generator 20 also has, for example, a constitution of a PLL circuit as shown in FIG. 3 and comprises the loop filter 21, the voltage controlled oscillator 22, the phase comparator No. 1 24, and the phase comparator No. 2 25. Since the data sampling clock generator 20 compares the input signal 10 from the pre-amplifier 9 and a signal generated by dividing the clock generated by the voltage controlled oscillator 22 by the divider 23 with the phase comparator No. 1 24, compares the pulse width information by crystal clock 35 from the data processor 28 and a signal generated by dividing the clock generated by the voltage controlled oscillator 22 by the divider 23 with the phase comparator No. 2 25, and adds the outputs from the phase comparators No. 1 24 and No. 2 25 by the adder 26, it follows the input signal 10 and follows a change in the rotation of the motor 2, that is, the linear velocity.

The aforementioned operations will be explained by referring to the timing chart shown in FIG. 4. At the time of access from the outer position of the disc 1 to the inner position, it is controlled at a CLV, so that predictive control for applying an accelerating voltage for accelerating the motor 2 beforehand is performed at the same time as movement of the pickup 5 from the outer position at a low line velocity to the inner position at a high line velocity. Assuming in this case that the clock generator 11 and the data sampling clock generator 20 have, for example, the constitutions of the PLL circuits shown in FIGS. 2 and 3, a voltage for lowering the oscillating frequency of the clock is generated so as to control the voltage controlled oscillators 13 and 22 at the same time as start of access and an operation clock following a change in the rotation of the disc 1, that is, the linear velocity is generated. Therefore, the subcode 32 including the time code is detected by the data processor 28 before the linear velocity is settled and the RAM 30 can be controlled by the RAM controller 31 so as to prevent the RAM 30 from overflowing or underflowing, that is, to make the data write speed into the RAM 30 equal to the data read speed from the RAM 30. By doing this, the subcode OK signal can be made "H", that is, OK almost at the same time as completion of the movement of the pickup as shown at the lowest part in FIG. 4 and the data reproducing operation can be started early.

On the other hand, inversely to the above, at the time of access from the inner position of the disc 1 to the outer position, it is controlled at a CLV, so that predictive control for applying a decelerating voltage for decelerating the motor 2 beforehand is performed at the same time as movement of the pickup 5 from the inner position at a high line velocity to the outer position at a low line velocity. Assuming in this case that the clock generator 11 and the data sampling clock generator 20 have, for example, the constitutions of the PLL circuits shown in FIGS. 2 and 3, a voltage for increasing the oscillating frequency of the clock is generated so as to control the voltage controlled oscillators 13 and 22 at the same time as start of access and an operation clock following a change in the rotation of the disc 1, that is, the linear velocity is generated. Therefore, the subcode 32 including the time code is detected by the data processor 28 before the linear velocity is settled and the RAM 30 can be controlled by the RAM controller 31 so as to prevent the RAM 30 from overflowing or underflowing.

According to this embodiment as mentioned above, at the time of access from the inner diameter zone of the disc 1 to the outer diameter zone or from the outer diameter zone to the inner diameter zone, a voltage for increasing or decreasing the oscillating frequency of the clock is generated at the same time as start of access so as to control the voltage controlled oscillators 13 and 22 and then an operation clock following a change in the rotation of the disc 1, that is, the linear velocity is generated. Therefore the subcode including the time code is detected before the linear velocity is settled and the RAM can be controlled so as to prevent it from overflowing or underflowing. Since the CLV controller 34 operates always by a constant high speed clock (crystal clock 38) using a crystal, the settling time for making the linear velocity constant can be minimized and the access time can be improved.

Figure 5:
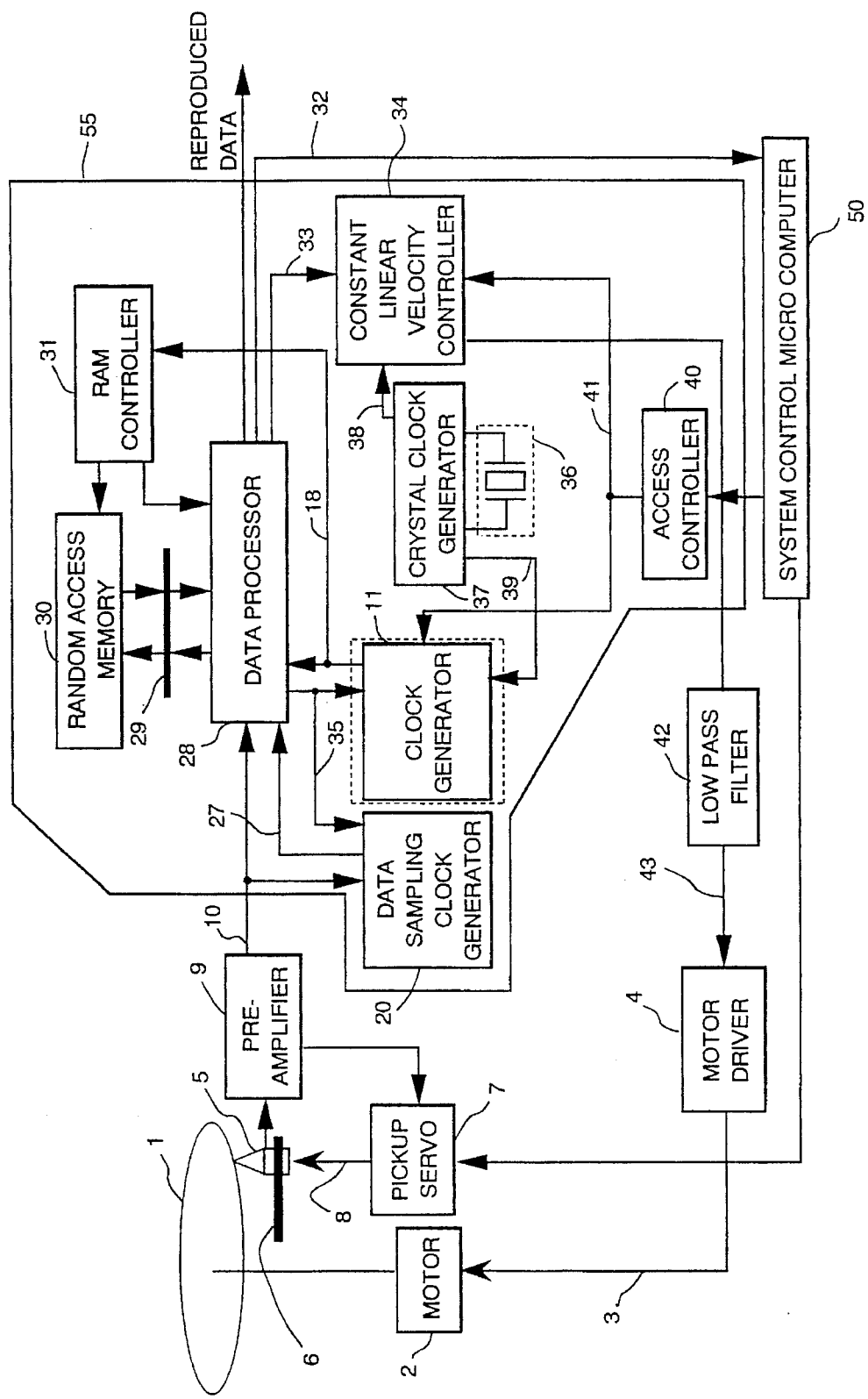
FIG. 5 is a block diagram showing the constitution of a disc reproducing apparatus of a second embodiment of the present invention.

FIG. 5 is a block diagram showing the constitution of a disc reproducing apparatus of the second embodiment of the present invention. In the drawing, the same numeral is assigned to each part which is the same as that described in the first embodiment shown in FIG. 1 and the explanation thereof will be omitted so as to avoid duplication (the same may said with the embodiments described later). In FIG. 5, a numeral 55 indicates a whole CD signal processor.

As in this embodiment shown in FIG. 5, the CD signal processor 55 having the RAM 30 and the access controller 40 built-in can be considered. In this case, the clock generator 11 may be built in the CD signal processor 55 or externally provided. The crystal 36 is externally provided.

Figure 6:
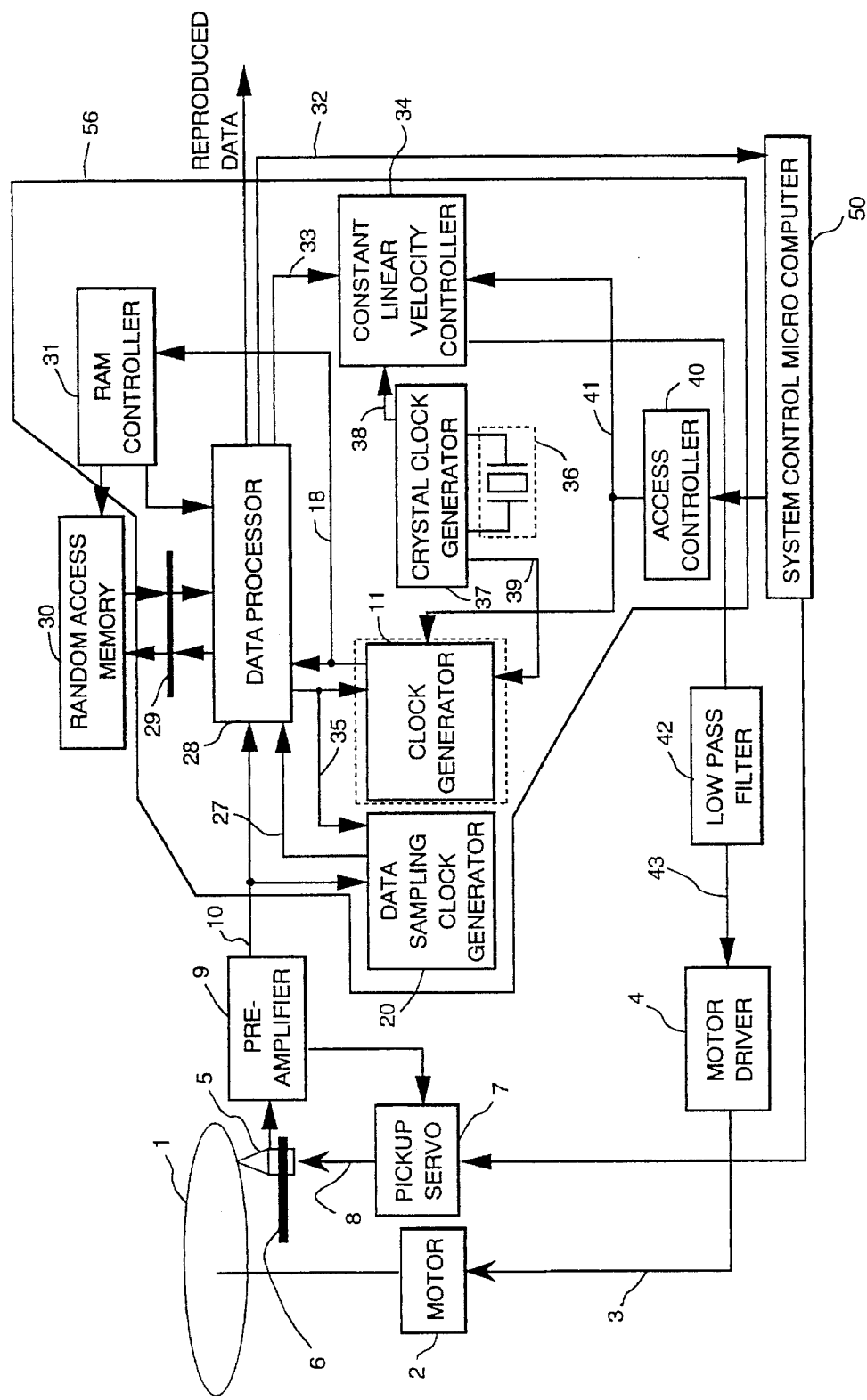
FIG. 6 is a block diagram showing the constitution of a disc reproducing apparatus of a third embodiment of the present invention.

FIG. 6 is a block diagram showing the constitution of a disc reproducing apparatus of the third embodiment of the present invention. In the drawing, a numeral 56 indicates a whole CD signal processor.

As in this embodiment shown in FIG. 6, the CD signal processor 56 having the RAM 30 externally provided and the access controller 40 built-in can be considered. In this case, the clock generator 11 may be built in the CD signal processor 56 or externally provided. The crystal 36 is externally provided.

Figure 7:
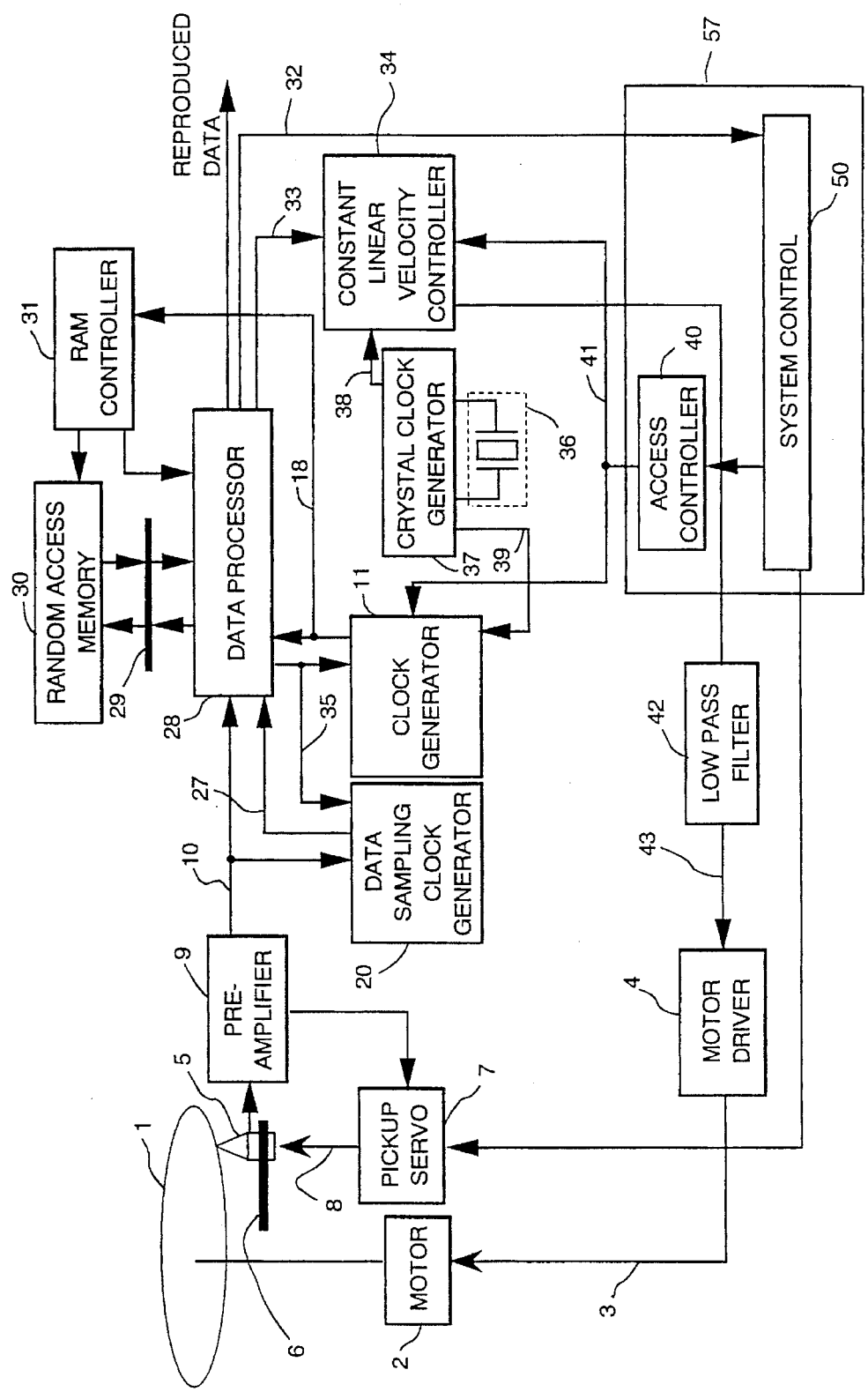
FIG. 7 is a block diagram showing the constitution of a disc reproducing apparatus of a fourth embodiment of the present invention.

FIG. 7 is a block diagram showing the constitution of a disc reproducing apparatus of the fourth embodiment of the present invention. In the drawing, a numeral 57 indicates a system control microcomputer having an access control function.

As in this embodiment shown in FIG. 7, the system control microcomputer 57 may have the function of the access controller 40.

What is claimed is:

1. A disc reproducing apparatus for reproducing a disc on which a digital information signal including an error correction code and a subcode having a time code therein is recorded in a predetermined recording format at a CLV, comprising:

means for rotating said disc;

first control means for controlling said rotating means to cause said rotating means to rotate said disc at the CLV during a continuous recording operation;

reading means for reading said digital information signal from said disc;

digital signal processing means for executing a predetermined reproducing digital signal processing such as demodulation and error correction for the digital information signal which is outputted from said reading means in correspondence with said recording format;

storage means for rearranging and memorizing data temporarily so as to perform an error correction corresponding to said recording format;

second control means for controlling said storage means;

first clock generating means for generating a reproducing clock corresponding to a transmission rate of said digital information signal;

oscillating means for generating a clock having a fixed frequency;

second clock generating means for generating a first master clock based on the clock generated by said oscillating means, the first master clock being for use as a reference clock for operations performed by said digital signal processing means, said first control means, and said second control means;

third clock generating means for generating a second master clock not based on the clock generated by said oscillating means, the second master clock being for use as a reference clock for operations performed by said digital signal processing means and said second control means;

switching means for selecting one of the first master clock and the second master clock and supplying the selected one of the first master clock and the second master clock to said digital signal processing means and said second control means;

third control means for controlling said first control means and said switching means; and fourth control means for controlling said disc reproducing apparatus;

wherein said third control means controls said switching means such that when the continuous reproducing operation is performed, said switching means selects the first master clock and supplies the first master clock to said digital signal processing means and said second control means such that said digital signal processing means and said second control means operate based on the first master clock, and when an access operation is performed, said switching means selects the second master clock and supplies the second master clock to said digital signal processing means and said second control means such that said digital signal processing means and said second control means operate based on the second master clock; and wherein the first master clock is always supplied to said first control means such that said first control means always operates based on the first master clock.

2. A disc reproducing apparatus according to claim 1, wherein said third control means controls said switching means such that said switching means selects the second master clock and supplies the second master clock to said digital signal processing means and said second control means when the access operation is started; and wherein said third control means controls said switching means such that said switching means selects the first master clock and supplies the first master clock to said digital signal processing means and said second control means after said disc is being rotated at the CLV by said rotating means under control of said first control means.

3. A disc reproducing apparatus according to claim 1, wherein said second control means controls said storage means so as to make a data write speed into said storage means substantially equal to a data read speed from said storage means when the access operation is performed.

4. A disc reproducing apparatus according to claim 1, wherein said first control means applies an accelerating or decelerating voltage to the rotating means when the access operation is started.

5. A disc reproducing apparatus for reproducing a disc on which a digital information signal including an error correction code and a subcode having a time code therein is recorded in a predetermined recording format at a CLV, comprising:

means for rotating said disc;

first control means for controlling said rotating means to cause said rotating means to rotate said disc at the CLV during a continuous recording operation;

reading means for reading said digital information signal from said disc;

digital signal processing means for executing a predetermined reproducing digital signal processing such as demodulation and error correction for the digital information signal which is outputted from said reading means in correspondence with said recording format;

storage means for rearranging and memorizing data temporarily so as to perform an error correction corresponding to said recording format;

second control means for controlling said storage means;

oscillating means for generating a clock having a fixed frequency; and system control means for controlling the disc reproducing apparatus;

wherein said digital signal processing means includes reproducing means for reproducing said subcode having the time code therein;

wherein said subcode reproducing means outputs a signal indicating whether a predetermined subcode reproduction is completed or not to said system control means; and wherein when the disc reproducing apparatus performs an access operation, said subcode reproducing means outputs said signal indicating whether the predetermined subcode reproduction is completed or not so as to indicate that the predetermined subcode reproduction is completed before said reading means moves to a target position and before said disc is being rotated at the CLV by said rotating means under control of said first control means.

6. A disc reproducing apparatus for reproducing a disc on which a digital information signal including an error correction code and a subcode having a time code therein is recorded in a predetermined recording format at a CLV, comprising:

means for rotating said disc;

first control means for controlling said rotating means to cause said rotating means to rotate said disc at the CLV during a continuous recording operation;

reading means for reading said digital information signal from said disc;

digital signal processing means for executing the predetermined reproducing digital signal processing such as demodulation and error correction for the digital information signal which is outputted from said reading means in correspondence with said recording format;

storage means for rearranging and memorizing data temporarily so as to perform an error correction corresponding to said recording format;

second control means for controlling said storage means;

first clock generating means for generating a reproducing clock corresponding to a transmission rate of said digital information signal;

oscillating means for generating a clock having a fixed frequency;

second clock generating means for generating a first master clock based on the clock generated by said oscillating means, the first master clock being for use as a reference clock for operations performed by said digital signal processing means, said first control means, and said second control means;

third clock generating means for generating a second master clock not based on the clock generated by said oscillating means, the second master clock being for use as a reference clock for operations performed by said digital signal processing means and said second control means;

switching means for selecting one of the first master clock and the second master clock and supplying the selected one of the first master clock and the second master clock to said digital signal processing means and said second control means;

third control means for controlling said first control means and said switching means;

fourth control means for controlling said disc reproducing apparatus; and means for changing a frequency of the reproducing clock generated by said first clock generating means and a frequency of the second master clock generated by said third clock generating means in accordance with a change in the CLV at which said disc is being rotated, the change in the CLV being produced by said rotating means under control of said first control means when an access operation is performed.

* * * * *